United States Patent [19]

Nieda et al.

[11] Patent Number: 4,980,012

[45] Date of Patent: Dec. 25, 1990

[54] APPARATUS FOR PREPARATION OF A SHEET-SHAPED PHOTOCONDUCTOR

[75] Inventors: Yoshiro Nieda, Otake; Yoshihiko Hoshide, Iwakuni; Masashi Okamoto, Otake, all of Japan

[73] Assignee: Mitsubishi Rayon Company Ltd, Tokyo, Japan

[21] Appl. No.: 385,384

[22] Filed: Jul. 25, 1989

[51] Int. Cl.$^5$ .................... G02B 6/04; B65H 57/04; B65H 57/16
[52] U.S. Cl. .................... 156/441; 156/167; 156/181; 156/433; 264/1.5; 350/96.23; 350/96.24
[58] Field of Search ............ 264/211.12, 1.5; 156/167, 441, 433; 65/4.3, 4.2; 350/96.23

[56] References Cited

U.S. PATENT DOCUMENTS

| 3,690,978 | 9/1972 | Nishizawa et al. | 156/167 |
| 4,195,161 | 3/1980 | Davis et al. | 528/309 |
| 4,379,771 | 4/1983 | Snyder | 264/1.5 |
| 4,708,833 | 11/1987 | Ohsawa et al. | 264/1.5 |

FOREIGN PATENT DOCUMENTS

| 0131058 | 1/1985 | European Pat. Off. | |
| 0165632 | 12/1985 | European Pat. Off. | |
| 2838977 | 3/1980 | Fed. Rep. of Germany | 156/167 |
| 61-25115 | 2/1986 | Japan | 350/96.23 |

OTHER PUBLICATIONS

The Transactions of the IECE of Japan, vol. E-61, No. 3, Mar. 1978, pp. 175-177; H. Suzuki et al.: "Flat Type Cable with Silicone Clad Optical Fibres", *Section 2(Flat Cable Fabrication); FIGS. 1,2*.

*Primary Examiner*—Caleb Weston
*Assistant Examiner*—Adrienne C. Johnstone
*Attorney, Agent, or Firm*—Oblon, Spivak, McClelland, Maier & Neustadt

[57] ABSTRACT

A sheet-shaped photoconductor composed of a plurality of optical fibers is prepared by melt-spinning a spinning dope into optical fibers and, before the as-spun fibers are completely solidified, bonding the fibers to one another along the entire length thereof. The melt-spinning is carried out using a nozzle having a plurality of annularly arranged orifices. The as-spun fibers are arranged linearly in parallel to but not in contact with one another by using a grooved guide, and then the optical fibers are brought into contact with and fusion-bonded to one another by using a fusion bonding guide having a concave curved face in the central portion thereof, and the thus-formed sheet-shaped photoconductor is taken up.

6 Claims, 3 Drawing Sheets

APPARATUS FOR PREPARATION OF A SHEET-SHAPED PHOTOCONDUCTOR

BACKGROUND OF THE INVENTION

1. Field of the Invention

The present invention relates to a process and apparatus for the preparation of a sheet-shaped photoconductor that can be used fore various image guides or as a photoconductive material.

2. Description of the Related Art

A sheet-shaped photoconductor comprising optical fibers is used as an element of an image guide or a photoconductor for various display devices. As the process for continuously preparing this sheet-shaped photoconductor, there is known a process in which many optical fibers are arranged in the form of a sheet by a comb-like guide and piano wires and then are bonded and fixed, as disclosed in Japanese Examined Patent Publication No. 52-38419. If, however, the optical fibers are forcibly passed through the guide, the outer surfaces of the optical fibers are damaged and the optical properties are lowered. Moreover, since the bonding step is indispensable, the operation is complicated and the manufacturing cost is increased.

As a means for overcoming these problems, Japanese Unexamined Patent Publication No. 50-8540 proposes a process in which many optical fibers are melt-spun, and the spun optical fibers are fusion-bonded in parallel to one another while the as-spun fibers are maintained at a temperature higher than the glass transition temperature, whereby a tape-shaped photoconductor is prepared. According to this process, the post bonding treatment becomes unnecessary, but since the fibers are arranged in the form of a sheet by a rod-shaped width-regulating guide arranged downstream of a spinning nozzle, the optical fibers spun cylindrically and concentrically must be immediately linearly arranged in parallel to one another. Moreover, since this width-regulating guide has a rod-like shape, the difference of the yarn tension of optical fibers spun from the central portion of the spinning nozzle from that of optical fibers spun from the peripheral portion of the spinning nozzle is large, and therefore, it is difficult to stably guide the optical fibers. Accordingly, yarn unevenness occurs or an overlapping of the optical fibers occurs locally in the sheet-like arrangement of the optical fibers, with the result that it is difficult to obtain a sheet having a uniform width, and an optical fiber sheet not having uniform optical transmission characteristics is often formed.

SUMMARY OF THE INVENTION

Under this background, a primary object of the present invention is to provide a process and apparatus in which a sheet-shaped photoconductor having excellent light transmission characteristics, a uniform width, and no overlapped portions, can be prepared at a high efficiency.

In accordance with one aspect of the present invention, there is provided a process for the preparation of a sheet-shaped photoconductor, which comprises melt-spinning a spinning dope into a plurality of optical fibers, and bonding them to one another along the entire length thereof before the optical fibers are cooled, to form a sheet-shaped photoconductor in which the optical fibers are arranged in parallel, wherein the optical fibers are melt-spun from a spinning nozzle having a plurality of orifices annularly arranged; the as-spun optical fibers are arranged linearly in parallel to but not in contact with one another and then the optical fibers are brought into contact with and fusion-bonded to one another; and the thus-formed sheet-shaped photo-conductor is taken up.

In accordance with another aspect of the present invention, there is provided an apparatus for the preparation of a sheet-shaped photoconductor, which comprises a nozzle having a plurality of annularly arranged orifices for melt-extruding a spinning dope for optical fibers; a grooved guide arranged so that the axis thereof extends in the vertical direction to the spinning axis of the melt-spinning nozzle, and having a plurality of grooves extending in the peripheral direction of the grooved guide; a fusion-bonding guide having a concave curved face in the central portion, which is arranged so that the axis thereof is substantially in parallel to the axis of the grooved guide; and a take-up roller for taking up a formed sheet-shaped photoconductor.

DESCRIPTION OF THE PREFERRED EMBODIMENTS

Figure 1:
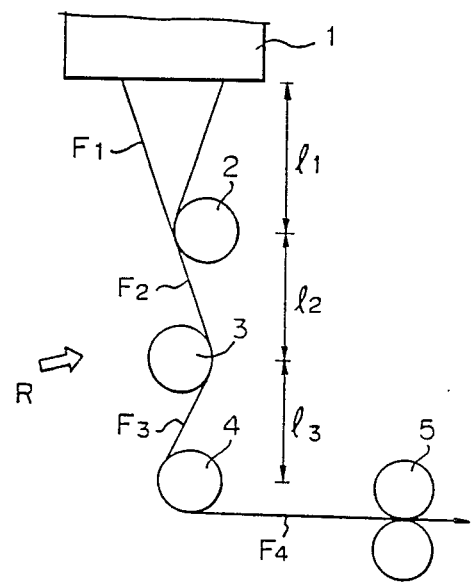
FIG. 1 is a schematic front view illustrating one embodiment of the apparatus for preparing a sheet-shaped photoconductor according to the present invention.
Figure 2:
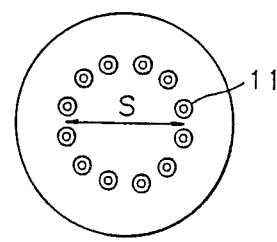
FIG. 2 is a bottom view illustrating the spinning nozzle shown in FIG. 1.
Figure 3:
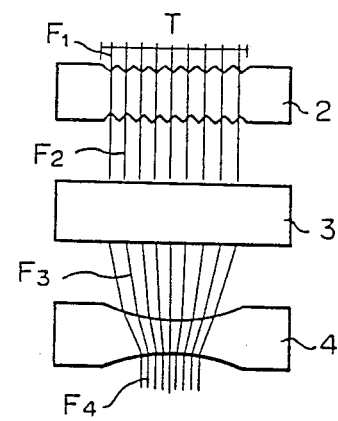
FIG. 3 is a perspective view of the main parts of the apparatus viewed in the direction of an arrow R shown in FIG. 1.
Figure 4:
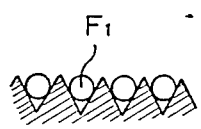
FIG. 4 is a partial enlarged section of the grooved guide shown in FIG. 1 and FIG. 2.

The present invention will now be described in detail with reference to embodiments illustrated in the accompanying drawings. FIG. 1 is a schematic front view of the apparatus of the present invention. In FIG. 1, optical fibers $F_1$ are melt-spun from a spinning nozzle having many orifices 11 annularly arranged therein (shown in the bottom view of FIG. 2). A grooved guide 2 is arranged so that the, axis thereof extends substantially in the perpendicular direction the axis of the spinning nozzle 1 and has a number of grooves formed therein equal to or larger than the number of the orifices. The grooves extend in the peripheral direction of the grooved guide. To obtain a sheet-shaped photoconductor having a superior performance, preferably the diameter S (in FIG. 2) of the circle along the circumference of which the orifices 11 are arranged is approximately equal to the sum T (in FIG. 3) of the widths of the grooves of the grooved guide 2 shown in FIG. 3. The shape of each groove the grooved guide 2 is not particularly critical, as long as contact between the optical fibers $F_1$ is prevented. For example, V-shaped grooves and U-shaped grooves can be used. Preferably, an auxiliary guide 3 is arranged so that the axis thereof is in parallel to the axis of the grooved guide 2 with a certain distance therebetween, as shown in FIGS. 1 and 3, but to obtain a good parallel arrangement among the optical fibers $F_2$, preferably the auxiliary guide 3 is located in a position such that the optical fibers $F_2$ traveling from the grooved guide 2 is slightly deviated whereby a certain tension is imposed on the optical fibers $F_2$. A fusion-bonding guide 4 has a concave curved face formed in the vicinity of the center thereof for arranging the optical fibers $F_3$ in parallel to one another and fusion-bonding them in this parallel state. The fusion-bonded optical fibers $F_4$ are taken up in the form of a sheet-shaped photoconductor by a first nip roller 5 (shown in FIG. 1).

Figure 5A:
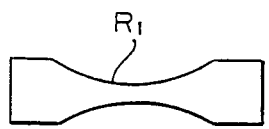
FIGS. 5A through 5C are front views showing examples of the fushion-bonding guide used in the present invention.
Figure 5B:
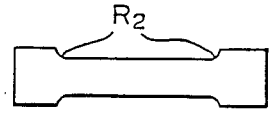
Figure 5C:
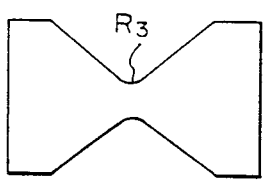

The preparation process will now be described with reference to FIGS. 1 through 10. Core and sheath components molten by melting devices not shown in the drawings are passed through predetermined flow paths and spun from the conjugate spinning nozzle 1. In this spinning nozzle 1, orifices 11 are annularly arranged to extrude optical fibers $F_1$ having a core-sheath structure. The spun fibers $F_1$ just after extrusion from the orifices 11 have a cylindrical shape having a diameter almost equal to the diameter S (FIG. 2) of the circle along the circumference of which the orifices 11 are arranged, but if the respective fibers $F_1$ are guided to the grooves of the grooved guide 2, the optical fibers $F_1$ can be linearly arranged in parallel to one another without contact thereamong (see FIG. 4). Since the optical fibers $F_1$ flow smoothly and substantially linearly in the grooves, no strain is imposed on the optical fibers $F_1$. Then a tension is applied to the optical fibers $F_2$ by the auxiliary guide 3 located downstream, to stabilize traveling of the optical fibers. At this point, the optical fibers $F_2$ are not fusion-bonded to one another and arrive independently at the fusion-bonding guide 4. Since the fusion-bonding guide 4 has a concave curved face in the central portion, the optical fibers $F_3$ are gathered and fusion-bonded to one another as shown in FIG. 3. The structures as shown in FIGS. 5A through 5C can be adopted for the fusion-bonding guide 4. More specifically, a structure having a curvature $R_1$ as shown in FIG. 5A, a structure having a curvature $R_2$ on both of the left and right sides as shown in FIG. 5B, and a structure having a V-shaped groove and a curvature $R_3$ at the center of the groove as shown in FIG. 5C can be adopted. The thus-combined optical fibers $F_4$ are substantially linearly arranged and fusion-bonded to one another and are taken up in this state by the nip roller 5 acting as the take-up roller. The sheet-shaped photoconductor of the optical fibers can be prepared in the above-mentioned manner. In the present invention, since optical fibers spun from the nozzle 1 are guided by the grooved guide 2 to stabilize the flow of the optical fibers, a substantially equal tension is imposed on the respective optical fibers, and a sheet-shaped photoconductor having a high uniformity with no local overlapping can be obtained.

Figure 6:
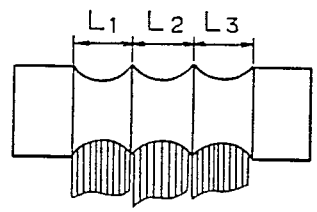
FIG. 6 is a front view showing another example of the fusion-bonding guide.

FIG. 6 shows an embodiment of the fusion-bonding guide which is the same as the guide 4 shown in FIGS. 1 and 3 except that the fusion-bonding guide in FIG. 6 is designed so that a plurality of sheet-shaped photoconductors can be prepared by using one spinning nozzle. More specifically, the fusion-bonding guide having a structure as shown in FIG. 6 is arranged instead of the fusion-bonding guide 4 shown in FIG. 1 in the apparatus of the present invention. Thus, the as-spun optical fibers are divided into a plurality of groups and are linearly distributed and arranged in a plurality of concave curved faces by this fusion-bonding guide, and each group of fibers are fusion-bonded to one another in this state to obtain a plurality of sheet-shaped photoconductors having different widths or the same widths.

Figure 7A:
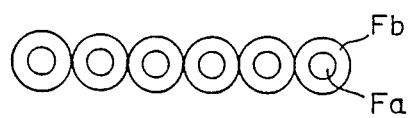
FIGS. 7A and 7B are sectional views showing a part of the sheet-shaped photoconductor obtained according to the present invention.
Figure 7B:
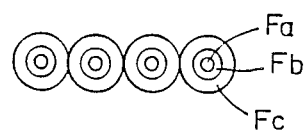

FIGS. 7A and 7B show the section of a part of the sheet-shaped photoconductor prepared in the present invention; wherein FIG. 7A shows an example composed of optical fibers having a two-layer structure comprising a core Fa and a sheath Fb, and FIG. 7B shows an example composed of optical fibers having a three-layer structure comprising a core Fa, a sheath Fb, and a protecting layer Fc.

Figure 8:
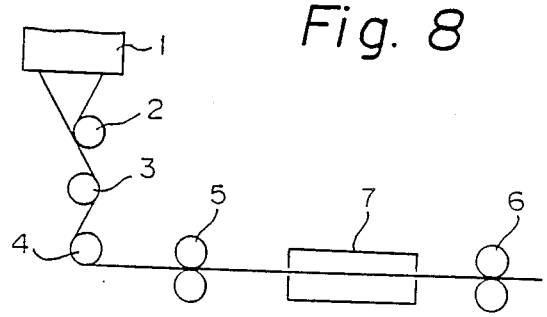
FIGS. 8 through 10 are front views showing other embodiments of the preparation apparatus of the present invention.

FIG. 8 illustrates another embodiment of the process for preparing a sheet-shaped photoconductor by using the apparatus of the present invention. In this embodiment, a second take-up roller (nip roller) 6 is arranged downstream of the first take-up roller (nip roller) 5, and a heating device 7 is disposed between the two nip rollers 5 and 6. In this embodiment, the sheet-shaped photoconductor can be subjected to hot drawing between the first and second nip rollers 5 and 6, whereby a high tenacity can be given to the optical fibers.

Figure 9:
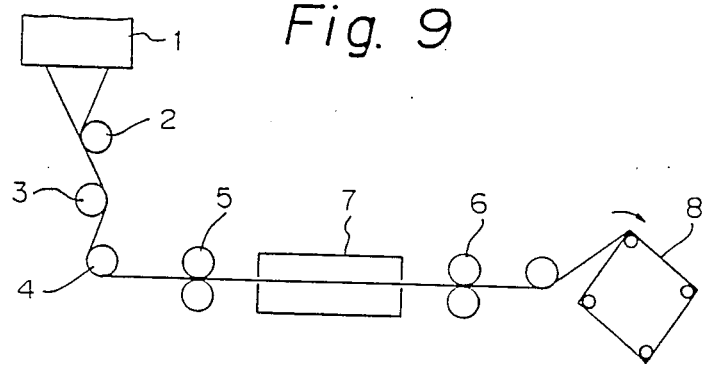

FIG. 9 illustrates still another embodiment in which a reeling winder 8 is arranged in the rear of the second nip roller 6 shown in FIG. 8. In this embodiment, the sheet-shaped photoconductor is wound on the reeling winder 8 and is overlapped in multiple layers, and the laminate is fixed and cut at the respective corners to prepare optical fiber bands having a length corresponding to one side of the reeling winder 8.

Figure 10:
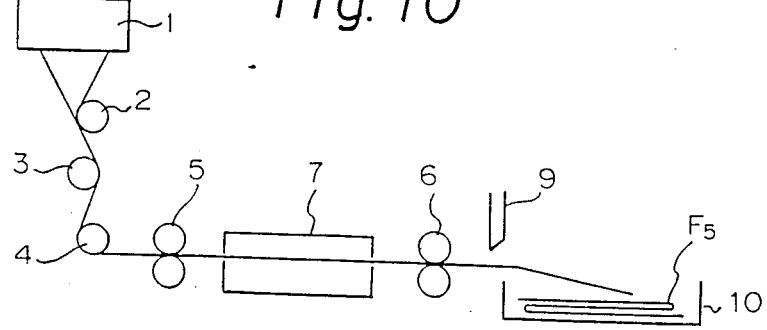

FIG. 10 illustrates an embodiment in which a sheet-shaped photoconductor $F_5$ having a certain length is obtained. In this embodiment, a cutter 9 is arranged behind the second nip roller 6 to cut the sheet-shaped photoconductor to predetermined lengths, and the cut photoconductors are stored in a container case 10.

The kind of optical fiber used in the present invention is not particularly critical, as long as melt spinning is possible, but plastic type optical fibers having a core composed of a thermoplastic resin such as an acrylic polymer, a polycarbonate or a polyallylate or a crosslinking-curing polymer such as a crosslinking silicone polymer, a crosslinking acrylate polymer, or an ion-crosslinking polymer and a sheath composed of a polymer having a refractive index smaller than that of the core polymer, such as a fluorine-containing polymer or an acrylic polymer, are preferably used. An appropriate protecting layer can be selected according to the intended use.

EXAMPLE 1

A sheet-shaped photoconductor was prepared by using the preparation apparatus shown in FIG. 1. A conjugate spinning nozzle 1 having 100 orifices 11 arranged annularly was used, and polymethyl methacrylate was supplied as the core component at a rate of 1.07 g/min per orifice and a fluorine-containing methacrylate polymer was supplied as the sheath component at a rate of 0.08 g/min per orifice. Conjugate melt spinning was carried out at a spinning temperature of 255° C., and then the spun fibers were passed through a grooved guide 2, an auxiliary guide 3, and a fusion-bonding guide 4, and a formed sheet-shaped photoconductor was taken up at a take-up speed of 120 m/min by a nip roller 5. The distance $l_1$ between the spinning nozzle 1 and the grooved guide 2 was adjusted to 300 mm, the distance $l_2$ between the grooved guide 2 and the auxiliary guide 3 was adjusted to 50 mm, and the distance $l_3$ between the auxiliary guide 3 and the fusion-bonding guide 4 was adjusted to 50 mm. The grooved guide 2, auxiliary guide 3, and fusion-bonding guide 4 were forcibly cooled so that the surface temperature of these guides were maintained at the same level. In the obtained sheet-shaped photoconductor, optical fibers, each having a diameter of 100 μm were uniformly arranged linearly in parallel to one another, and the width of the sheet-shaped photoconductor was 10 mm. The single fiber diameter in the 100 optical fibers was within 100 μm±1 μm, and the light transmission performance was as high as 285 dB/km ±30 dB/km.

EXAMPLE 2

A sheet-shaped photoconductor was prepared by arranging a fusion-bonding guide having a structure as shown in FIG. 6 in the same apparatus as used in Example 1. Polymethyl methacrylate was supplied as the core component at a rate of 2.45 g/min per orifice, a fluorine-containing methacrylate polymer was supplied as the sheath component at a rate of 0.15 g/min per orifice, and polymethyl methacrylate was supplied as the protecting layer component at a rate of 0.13 g/min per orifice. Conjugate spinning was carried out at a spinning temperature of 250° C., the spun fibers were divided into 4 groups, each consisting of 25 fibers, by the fusion-bonding guide, the optical fibers were taken up at a speed of 50 m/min, and sheet-shaped photoconductors were prepared by using a heating device 7 as shown in FIG. 8 (the inner temperature was adjusted to 200° C.). Note, the take-up speed of the second nip roller 6 was adjusted to 51 m/min to draw the photoconductors at a draw ratio of 1.05.

In each of the obtained sheet-shaped photoconductors, the single fiber diameter was 250 μm and the sheet width was 6.25 mm, and the single fiber diameter in the 100 fibers was within 250 μm ±2 μm and the light transmission performance was within 230 dB/km ±20 dB/km. None of the sheet-shaped photoconductors had a meandering strain but was very pliable.

According to the present invention, a sheet-shaped photoconductor having good light transmission characteristics, and which is uniform without local overlapping or meandering strain, can be prepared at a high efficiency.

We claim:

1. An apparatus for the preparation of a sheet-shaped photoconductor, which comprises a nozzle having a plurality of annularly arranged orifices for melt-extruding a spinning dope for optical fibers; a grooved guide arranged so that the axis thereby extends in the perpendicular direction to the spinning axis of the melt-spinning nozzle, and having a plurality of grooves extending in the peripheral direction of the grooved guide; a fusion-bonding guide having a concave curved face in the central portion, which is arranged so that the axis thereof is substantially in parallel to the axis of the grooved guide; and a take-up roller for taking up a formed sheet-shaped photoconductor.

2. An apparatus according to claim 1, wherein the number of the grooves formed in the grooved guide is equal to or larger than the number of the orifices of the nozzle, and the sum of the widths of the grooves is approximately equal to the diameter of the circle along the circumference of which the orifices are arranged.

3. An apparatus according to claim 1, which further comprises an auxiliary guide arranged between the grooved guide and the fusion-bonding guide so that the axis of the auxiliary guide is in parallel to the axes of the grooved guide and the fusion bonding guide.

4. An apparatus according to claim 1, wherein the auxiliary guide is located in a position such that the optical fibers traveling from the grooved guide is slightly deviated whereby a tension is imposed on the optical fibers.

5. An apparatus according to claim 1, wherein the fusion-bonding guide has a plurality of concave curved faces whereby the optical fibers are divided into a plurality of groups and each group is formed into a sheet-shaped photoconductor.

6. An apparatus according to claim 1, which further comprises a second take-up roller arranged downstream of the take-up roller, and a heating device arranged between the two take-up rollers.

* * * * *